Dec. 17, 1957    W. W. MILLER ET AL    2,816,809
LITTER BAG HOLDER WITH COMBINED BAG COVER
AND TRAY FOR MOTOR VEHICLES
Filed Feb. 21, 1956

INVENTORS.
WALLACE W. MILLER
WILLIAM D. YORK
BY
Knox & Knox

United States Patent Office 2,816,809
Patented Dec. 17, 1957

2,816,809

LITTER BAG HOLDER WITH COMBINED BAG COVER AND TRAY FOR MOTOR VEHICLES

Wallace W. Miller, El Cajon, and William D. York, San Diego, Calif.

Application February 21, 1956, Serial No. 566,854

4 Claims. (Cl. 312—270)

The present invention relates generally to bag holders and more particularly to a holder for disposable litter bags for motor vehicles.

The primary object of this invention is to provide a bag holder for a motor vehicle which is readily accessible to occupants of the front seat of the vehicle.

Another object of this invention is to provide a bag holder of a construction allowing the same holder to be used with paper bags of different sizes, plastic bags, and the like.

Another object of this invention is to provide a bag holder having an inner frame slidable within a support frame rigidly mounted beneath the instrument panel of a vehicle.

Another object of this invention is to provide a bag holder in which a bag is securely held in said intermediate frame by means of a resilient expander.

Another object of this invention is to provide a bag holder having a cover which is also slidable within the support frame.

Another object of this invention is to provide a device of the type described in which the said cover also constitutes an article holding tray.

Another object of this invention is to provide a bag holder which is adapted for fabrication from many different materials, so that the choice of material can be according to the dictates of availability and price considerations, the exact sizes and proportions being matters easily determined to suit particular conditions and needs.

Another object of this invention is to provide a bag holder which is practicable and inexpensive to manufacture.

Another object of this invention is to provide a device of the type described in which the front panel of said inner frame is provided with a decorative strip of plastic or the like blending with the interior color scheme of the vehicle and constituting a handle for the inner frame.

Another object of this invention is to provide a bag and bag frame holder combination including a bag having at its mouth resilient means, integral with or separable from the bag proper, to expand the mouth portion of the bag into firm engagement with the holder.

Finally, it is an object to provide a bag holder which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1:
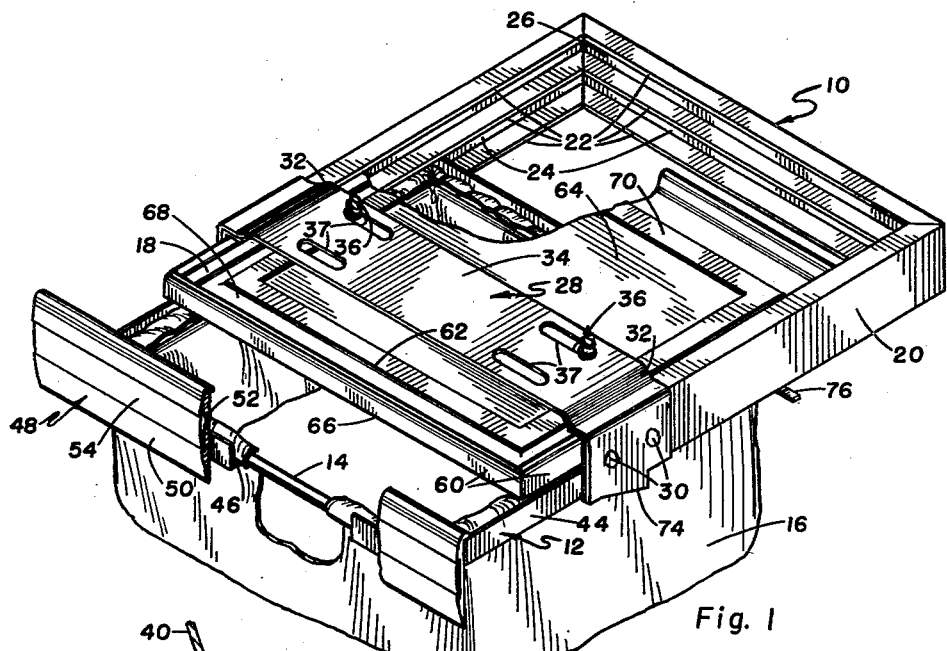
Figure 1 is a fragmentary perspective view of the device with the screws wherewith it is mounted beneath the instrument panel of a vehicle, portions of the front panel and slidable cover being removed for clarity of representation.
Figure 2:
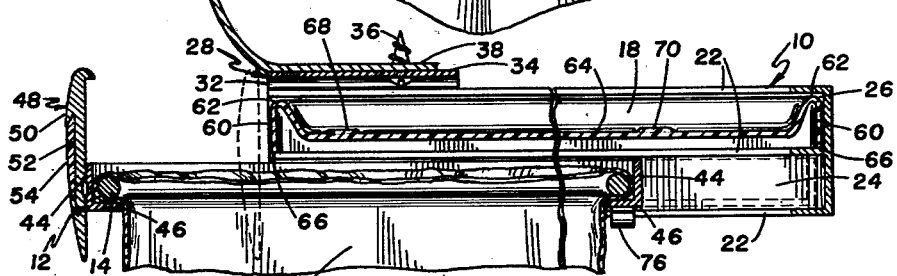
Figure 2 is a longitudinal sectional view of the device attached to an instrument panel, the cover being shown in fully retracted position and the inner frame being indicated in retracted or closed position in dash line, the instrument panel and a bag being shown only fragmentarily.
Figure 3:
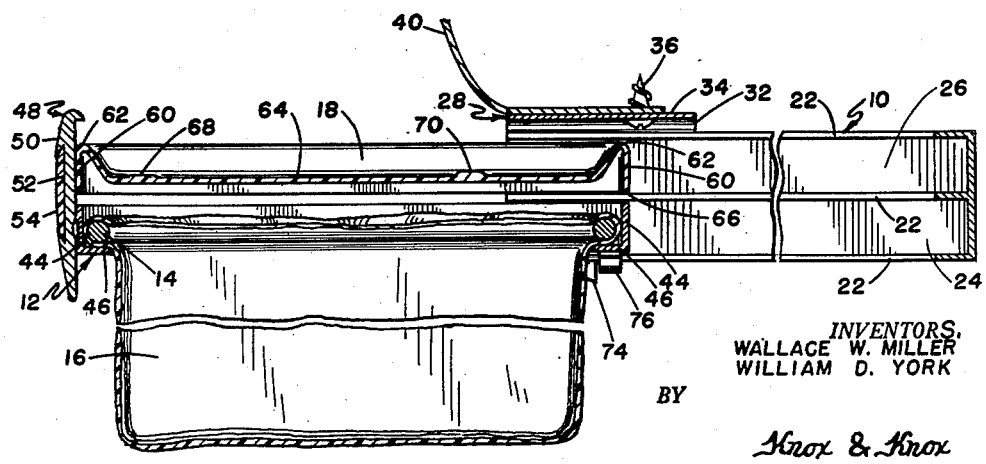
Figure 3 is a similar view showing the bag and cover extended, the cover in this position functioning as a closure for the bag and also functioning as a tray.

Referring now to the drawings in detail, the instant invention is shown as comprising a mounting frame 10, an inner frame 12 longitudinally slidable therein, a resilient wire expander 14, a bag 16, and a cover 18 above said inner frame 12 and also longitudinally slidable in said mounting frame 10 and closing said bag when vertically registered therewith.

The mounting frame 10 is U-shaped in plan form, the three sides of the frame being of similar cross-sectional shape and having a vertical web 20 and three horizontal flanges or legs 22 extending inwardly therefrom to form two U-shaped, parallel channels 24, 26 therein. The frame 10 is held in a substantially horizontal position by means of a saddle bracket 28 provided with end portions shaped to engage the uppermost leg 22 and the web 20, and rigidly secured thereto by suitable means such as the spotwelding indicated at 30 or any other means which will not present an obstacle in the channels 24, 26. The bracket 28 is bent as at 32 to provide slight elevation of the center portion 34 for a purpose more fully disclosed hereinafter. Metal screws 36 extending upwardly through the bracket 28 and the lip 38 of the instrument panel 40 of a vehicle rigidly secure the frame 10 in a horizontal position, longitudinal slots 37 being provided in the bracket 28 to allow positioning the frame 10 on the panel 40.

It will be obvious that the sides of the frame 10 may be made up of two channel sections secured together to form the desired E-shape and it will also be obvious that many other means of attaching the bracket 28 to the lip 38 are possible.

The inner frame 12 is rectangular in plan form, the sides thereof having a vertically disposed flange or wall 44, and a horizontally disposed base flange 46 presenting a right-angular cross section, the base flange 46 extending inwardly of the frame 12. A front panel 48 is attached to the flange 44 of one side of the frame 12 and is of a depth to extend a distance below the inner frame 12 to function as a finger pull or handle for the inner frame, as mentioned in the ninth object hereinabove set forth. The front panel 48 also extends upwardly from the inner frame sufficiently to bring the upper edge thereof into approximately co-planar relationship with the center portion 34 of the bracket 28 when the frame 12 is inserted into the lower channel 24 of the frame 10. The front panel 48 is also provided with an arcuate face 50 in which a longitudinal recess 52 is provided, said recess 52 permitting the insertion thereinto of a strip 54 of colored plastic or the like, thus increasing the attractiveness of the holder.

The expander 14 is also substantially rectangular in plan form, and is made of a single section of resilient wire or the like, dimensioned to fit snugly against at least 3 of the vertical flanges 44 of the inner frame 12, with the upper edges of the bag 16 held therebetween and also supported by the base flange 46. A bag 16 inserted in the rectangular opening defined by the inwardly disposed edges of the bases 46 will be held securely in position by the expander 14 inserted into the mouth of the bag 16, the expander and bag being held in position within the confines of the frame 12 as previously described herein.

A bag cover 18, which also functions as a tray, is mounted in slidable relationship with the upper channel 26. The cover 18 may be of mouded plastic or the like, and is provided with vertically disposed sides 60 having rounded upper edges 62 extending inwardly and downwardly therefrom to the bottom 64, the bottom 64 being planar and elevated slightly from the lower edge 66 of the sides 60. The lower edges 66 slide on the upper surface of the centrally located leg 22 of the frame 10, the forwardly disposed edge 66 providing a convenient finger-pull for moving the cover 18. When the frame 12 is closed, that is, with the front panel 48 touching or at least closely adjacent the saddle bracket 28, the cover is fully effective as a closure for the bag 16, thus substantially reducing any annoyance of the occupants of the vehicle due to the unpleasant odors usually accompanying accumulations of trash.

The cover 18 may be moved in the channel 26 independently of the frame 12 when the frame 12 is in what may be considered open position, thus allowing articles to be deposited in the bag 16, without any secondary movement of the cover 18 being necessary. Alternatively, the cover 18 may be pulled out with the inner frame 12, and it then serves as a convenient tray for food, beverages, or other articles such as might be used by a vehicle's occupant, while substantially preventing the escape of unpleasant odors from the bag.

The inner frame 12 and the cover 18 are preferably reasonably snugly fitted in the frame 10 and inadvertent withdrawal is unlikely, a further precaution against inadvertent withdrawal is provided in the form of indicia 68 on the upper surface of the cover or tray. The indicia may take the form of a colored border, the inner portion 70 thereof remote from the front panel 48 being considerably spaced from edge of the cover remote from the front panel. No instruction is required in order for the portion 70 to function as a warning or indication that the cover or tray has been pulled out to the proper, safe position since the implication is obvious. However, a stop for the inner frame 12 may be added if desired, and may comprise opposed keepers 74 depending from the vertically disposed ends of the bracket 28, and spring latches 76 attached to the base flange 46 at the rearwardly disposed side of the frame 12, and extending outwardly therefrom beyond the webs 20 at each side of the frame 10. The rearwardly disposed faces of the keepers are substantially vertical, the spring latches 76 contacting said keepers as the frame 12 is pulled out of the frame 10 to the designed limit of the frame 10 thus preventing inadvertent removal of the frame. The frame 12 may be periodically removed from the frame 10 when desired, by simply depressing the spring latches 76 below the keepers 74. The forwardly disposed faces of the keepers 74 are beveled to facilitate re-insertion of the frame 12.

It now becomes clearly evident that the instant invention provides a convenient and attractive receptacle for trash and litter accumulated by the occupants of a vehicle, the bag 16 being easily removable from the holder for disposal or at least emptying into receptacles provided for that purpose in homes and on the streets, thus aiding in the reduction of unsightly litter along roadways. The dual function of the element 18, as a cover for the bag 16 in any position thereof and as a handy tray when fully or partially extended, is noteworthy.

Further description would appear to be unnecessary.

It is understood that minor variation from the form of the invention disclosed herein may be made without departure from the spirit and scope of the invention, and that the specification and drawing are to be considered as merely illustrative rather than limiting.

We claim:

1. A holder for a removable litter bag for motor vehicles, comprising: a substantially U-shaped, horizontally mounted frame; an inner frame in slidable relationship within said first mentioned frame; a disposable bag; means to secure said bag to said inner frame; a bag cover, independently slidable in said first mentioned frame and constituting a cover for said bag when vertically registered therewith.

2. A holder according to claim 1 wherein the first mentioned frame is E-shaped in cross section to define two vertically spaced, confronting, parallel, substantially coextensive, horizontal channels therein; said inner frame and cover being slidably mounted in said channels.

3. A holder according to claim 1 wherein said inner frame has secured thereto a substantially vertical panel extending below the level of the inner frame and functional as a finger-pull for the inner frame; said panel also constituting a stop limiting the extension of the cover with reference to the inner frame.

4. A holder according to claim 1 wherein said means comprises a substantially rectangular expander of resilient wire or the like dimensioned to lie closely adjacent and internally of said inner frame and clamping upper end portions of said bag therebetween.

References Cited in the file of this patent

UNITED STATES PATENTS 952,699     Brien _____ Mar. 22, 1900

FOREIGN PATENTS 975,649     France _____ Oct. 4, 1941